(12) United States Patent
Campagnolo et al.

(10) Patent No.: US 7,200,447 B2
(45) Date of Patent: *Apr. 3, 2007

(54) MULTIPROCESSOR CONTROL SYSTEM FOR CYCLES, FOR EXAMPLE FOR COMPETITION BICYCLES

(75) Inventors: Valentino Campagnolo, Vicenza (IT); Gianfranco Guderzo, Tezze-Arzignano (IT)

(73) Assignee: Campagnolo, S.r.l., Vicenza (IT)

( * ) Notice: Subject to any disclaimer, the term of this patent is extended or adjusted under 35 U.S.C. 154(b) by 64 days.

This patent is subject to a terminal disclaimer.

(21) Appl. No.: 10/880,076

(22) Filed: Jun. 29, 2004

(65) Prior Publication Data

US 2004/0254650 A1    Dec. 16, 2004

Related U.S. Application Data

(63) Continuation of application No. 09/805,113, filed on Mar. 14, 2001, now Pat. No. 6,757,567.

(30) Foreign Application Priority Data

Mar. 29, 2000  (IT)  .......... TO 2000/A0293

(51) Int. Cl.
  *G05B 15/00*  (2006.01)
  *G05B 19/18*  (2006.01)
  *G05B 15/02*  (2006.01)
  *G05B 11/01*  (2006.01)

(52) U.S. Cl. .......... 700/17; 700/1; 700/2; 700/9; 700/19; 700/20; 700/83

(58) Field of Classification Search ............ 700/1, 700/2, 9, 17, 19–20, 83
See application file for complete search history.

(56) References Cited

U.S. PATENT DOCUMENTS

| 4,613,129 | A | * | 9/1986 | Schroeder et al. ............ 482/63 |
| 4,780,864 | A |   | 10/1988 | Houlihan |
| 5,231,872 | A |   | 8/1993 | Bowler et al. |
| 5,261,858 | A |   | 11/1993 | Browning |
| 5,298,865 | A |   | 3/1994 | Denz et al. |
| 5,335,540 | A |   | 8/1994 | Bowler et al. |
| 5,435,315 | A |   | 7/1995 | McPhee et al. |
| 5,527,239 | A |   | 6/1996 | Abbondanza |
| 5,551,315 | A | * | 9/1996 | Pikoulas .................. 74/502.2 |
| 5,569,104 | A | * | 10/1996 | Bellio et al. ................ 474/70 |
| 5,599,244 | A | * | 2/1997 | Ethington .................. 474/70 |
| 5,644,511 | A | * | 7/1997 | McWhorter ............... 702/148 |

(Continued)

FOREIGN PATENT DOCUMENTS

| DE | 34 45 617 A1 | 7/1985 |
| DE | 3 709 587 A | 10/1987 |
| DE | 40 04 981 C1 | 5/1991 |

(Continued)

*Primary Examiner*—Anthony Knight
*Assistant Examiner*—Ronald D Hartman, Jr.
(74) *Attorney, Agent, or Firm*—Volpe and Koenig, P.C.

(57) ABSTRACT

An electronic control system for cycles, for use with a set of sensors, a set of actuators, and a set of control members associated to a cycle. The system having a first processor unit for processing and displaying information; a second processor unit for communication and for interfacing with said set of control members; and a third processor unit for interfacing with said set of sensors and said set of actuators. The first processor unit, the second processor unit, and the third processor unit are connected together via asynchronous bi-directional communication channels.

24 Claims, 5 Drawing Sheets

U.S. PATENT DOCUMENTS

| | | | |
|---|---|---|---|
| 5,648,966 A | 7/1997 | Kondo et al. | |
| 5,847,641 A | * 12/1998 | Jinbo | 340/432 |
| 6,015,159 A | * 1/2000 | Matsuo | 280/238 |
| 6,023,646 A | 2/2000 | Kubacsi et al. | |
| 6,049,295 A | 4/2000 | Sato | |
| 6,069,788 A | * 5/2000 | Masui | 361/683 |
| 6,087,938 A | 7/2000 | Gitelis et al. | |
| 6,148,262 A | 11/2000 | Fry | |
| 6,192,300 B1 | * 2/2001 | Watarai et al. | 701/1 |
| 6,405,340 B1 | 6/2002 | Irvin et al. | |
| 6,420,797 B1 | 7/2002 | Steele et al. | |
| 6,430,040 B1 | 8/2002 | Masui | |

FOREIGN PATENT DOCUMENTS

| | | |
|---|---|---|
| DE | 296 04 853 U1 | 7/1996 |
| EP | 0 048 662 A1 | 3/1982 |
| EP | 0 081 807 A1 | 6/1983 |
| EP | 0 416 325 A2 | 3/1991 |
| EP | 0 820 923 A1 | 1/1998 |
| EP | 0 887 251 A1 | 12/1998 |
| FR | 2 533 025 A1 | 3/1984 |
| FR | 2 654 698 A | 5/1991 |
| GB | 2 166 598 A | 5/1986 |
| GB | 2 188 459 A | 9/1987 |
| GB | 2 188 489 A | 9/1987 |
| JP | 57 014 107 | 8/1983 |
| JP | 5 347 649 A | 12/1993 |
| JP | 5 347 650 A | 12/1993 |
| JP | 5 347 651 A | 12/1993 |
| WO | WO 89/00401 | 1/1989 |
| WO | WO 9 2/14 620 A | 9/1992 |
| WO | WO 93/16891 | 9/1993 |

* cited by examiner

Fig_1

Fig_4
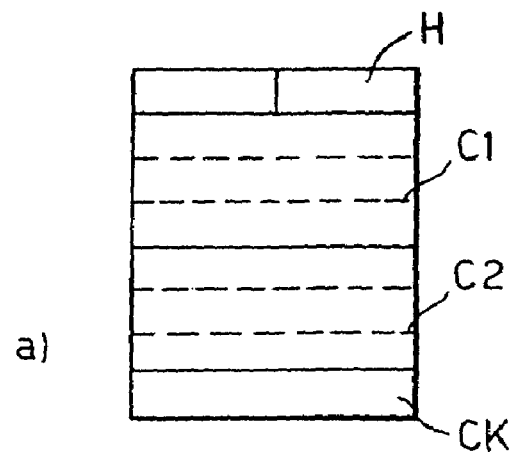
a)
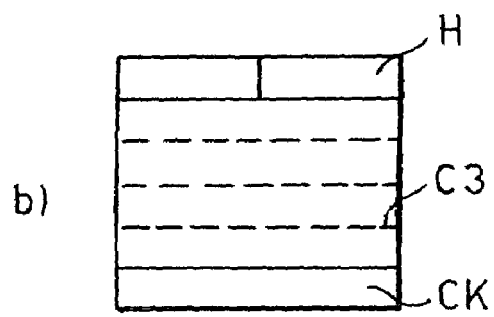
b)
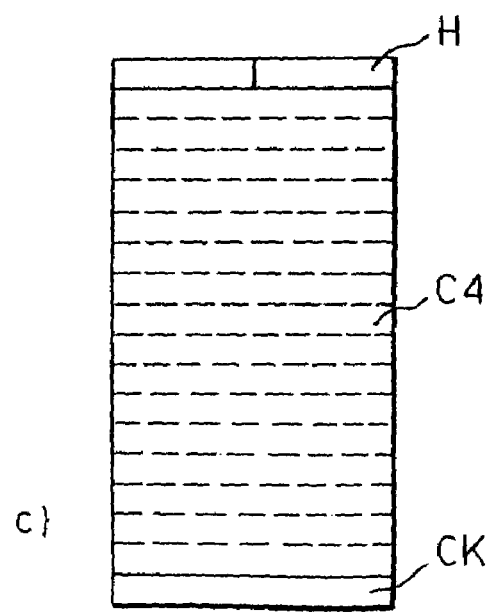
c)

Fig_5
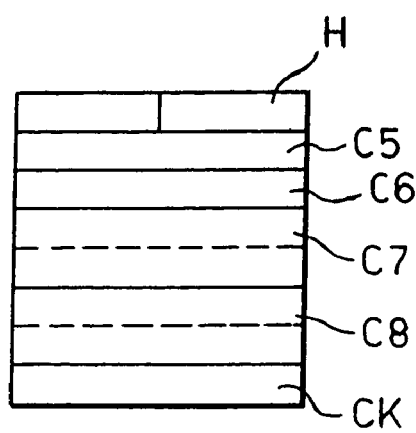
Fig_6
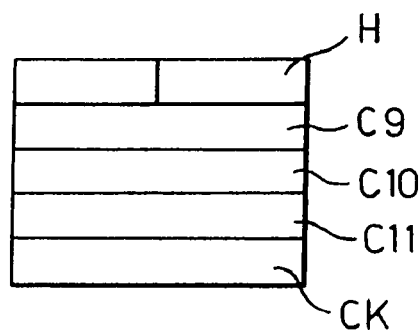
Fig_7
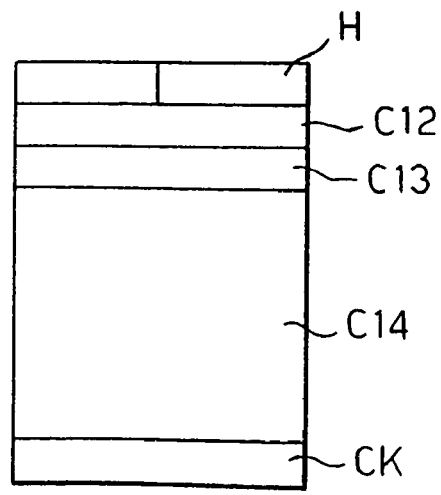

MULTIPROCESSOR CONTROL SYSTEM FOR CYCLES, FOR EXAMPLE FOR COMPETITION BICYCLES

CROSS REFERENCE TO RELATED APPLICATION

This application is a continuation of U.S. patent application Ser. No. 09/805,113, filed Mar. 14, 2001 now U.S. Pat. No. 6,757,567 which is incorporated by reference as if fully set forth.

FIELD OF INVENTION

The present invention relates to control systems for cycles and has been developed with particular attention paid to the possible application to competition bicycles. In any case, the reference to this possible application, and in particular the reference to the application to racing bicycles, must not be interpreted as limiting the possible field of application of the invention.

BACKGROUND

Over the last few years there has developed, in the cycle sector, the tendency to use sensors of various nature so as to be able to acquire information regarding the conditions of use/behaviour of the means, the aim being to be able to intervene through actuators of various nature to modify—according to certain criteria, and acting both in an automatic way and according to specific commands issued by the user, the conditions of use/behaviour of the means, in particular as regards its set.

This tendency is expressed in the direction of a continuous increase in the quantity of data picked up and processed, which results in the need to have available increasingly more sophisticated and articulated systems, these being systems which, since they have to be mounted on board the cycle, must not adversely affect the performance of the latter, in particular in terms of weight, overall dimensions, and consumption of electrical energy.

SUMMARY

The purpose of the present invention is to meet the ever more demanding needs felt in the sector, overcoming the drawbacks outlined above.

According to the present invention, this purpose is achieved thanks to a system having the characteristics specifically called for in the claims which follow.

In brief, the system according to the invention is based on a multiprocessor electronic structure for controlling and managing operation of a cycle, such as a competition bicycle.

The solution according to the invention is based upon the identification of functional areas to be modularized, with the aim of arriving at an integrated control system for controlling the functions of the cycle and for monitoring the set of the cycle during use, also to obtain an improvement in the overall performance of the system made up of the cycle and its user. In particular, the architecture deriving from the modularization in functional units enables a careful evaluation of the signal-propagation timing to be made in the framework of the system, at the same time achieving a reduction in the number of connections.

BRIEF DESCRIPTION OF THE DRAWINGS

The invention will now be described, purely by way of non-limiting example, with reference to the attached drawings, in which:

FIGS. 4 to 7 illustrate in greater detail the modalities adopted for the transmission of various signals in the context of the system according to the invention.

DETAILED DESCRIPTION OF THE PREFERRED EMBODIMENTS

Figure 1:
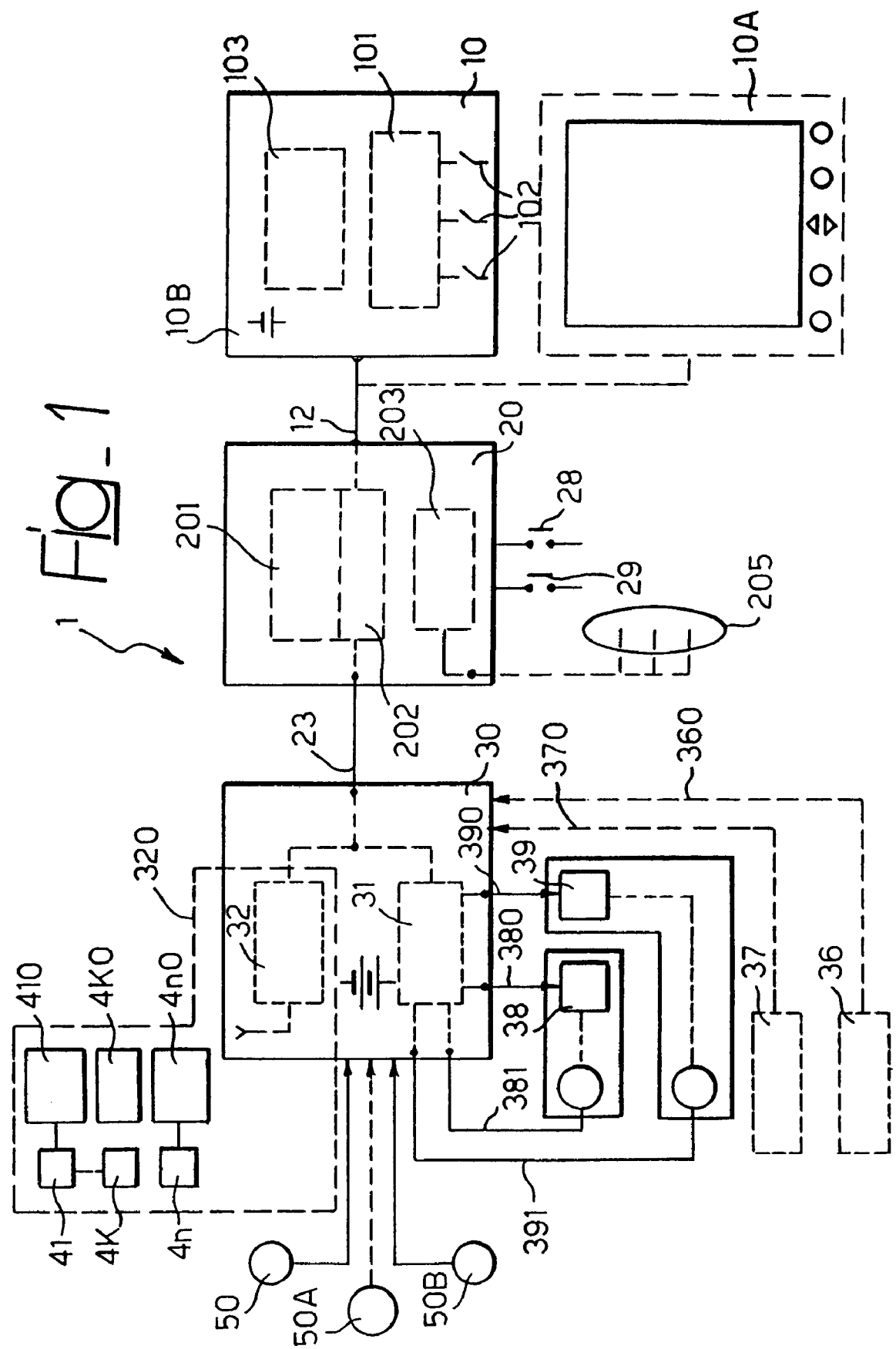
FIG. 1 illustrates, in the form of a block diagram, the overall architecture of a system according to the invention.

The system according to the invention, designated as a whole by 1, is made up of a set of functional blocks interconnected at the level of communication channels. The aforesaid functional blocks may be located in an optimized way on a cycle, such as a racing bicycle, as will be described in greater detail in what follows with reference to FIG. 2.

In general terms, the system 1 basically comprises the following functional blocks:

- a first block 10, designed to function as a display and management interface of the system;
- a second block 20, designed to function as an interface and module for managing the requests made by the user, both in relation to execution of commands issued by the user himself and as regards the variation in set, state and/or various functional parameters of the cycle, as well as in terms of the possible activation of particular operating modes (for instance, for training sessions, etc.); the block 20 can also perform the function of sorting communications from and to the various other functional blocks of the system; and
- a third block 30, designed to perform the task of controlling specific functions, for instance controlling servo members and/or exchanging communications through a local radio network (for example a network of the type currently known as Wireless Local Area Network—WLAN).

From a more detailed examination of the structure of the blocks in question, it may be noted that the block 10 usually encloses within it a main processor 101, to which one or more control push-buttons 102 are associated, as well as a display unit 103.

Figure 2:
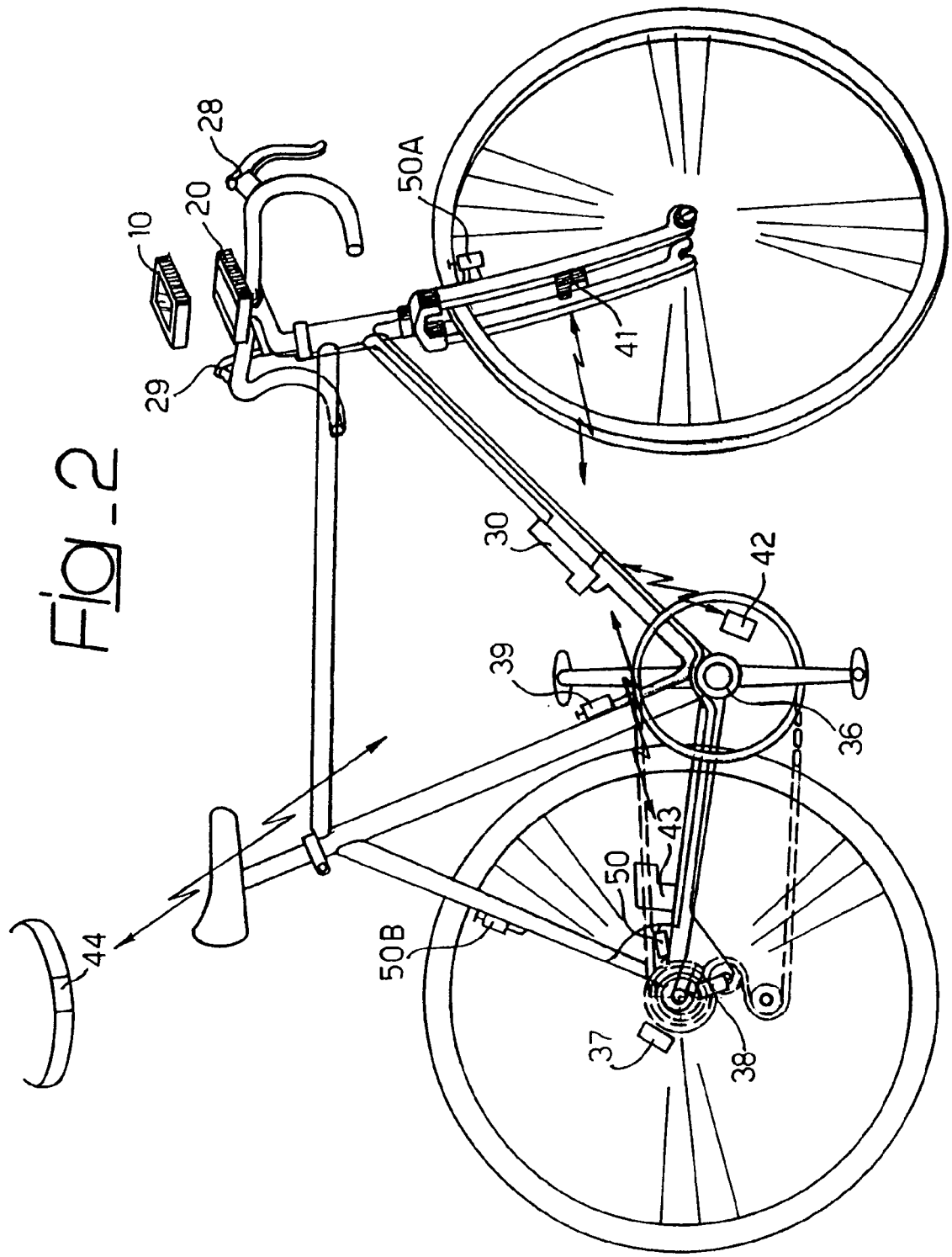
FIG. 2 is a schematic illustration of the way in which the various modules making up the system represented in FIG. 1 can be mounted on a cycle, such as a racing bicycle.

As may be better seen in the representation of FIG. 2, the block 10 is preferably built as an element that can be selectively removed from the cycle. In this sense, the block 10 may be configured, in particular as regards the communications with the block 20, in such a way as to be at least in part integratable, duplicatable, and emulatable by a further processor block 10a, which may be basically configured as a so-called "user organizer". The latter device is to be deemed in itself known.

The block 20 comprises, as its main element, a processor 201 for managing the communications, with associated thereto a serial control unit 202. The same block 20 further preferably incorporates a circuit 203 for managing inputs, which may be connected, for example, to one or more control push-buttons 28, 29 located on the handlebars of the cycle (see again FIG. 2), the handlebars being the element on which the block 20 is usually mounted, preferably in a central position.

The reference 205 designates one or more possible sensors connected to the circuit 203. These sensors may, for instance, be slope sensors, altitude sensors, temperature sensors, etc. Sensors of this type are known in the prior art, and consequently do not need to be described in a detailed way herein.

In this connection, it should be noted that the present invention mainly regards the overall architecture of the system 1, its organization in blocks, and the modalities adopted for co-coordinating communication and interaction between the various blocks. The present detailed description hence relates primarily to these aspects and is not extended—for evident reasons of brevity—to individual elements, which are to be deemed as a whole known.

Passing on now to an examination of the block 30, the reference 31 designates a processor designed to perform primarily the function of controlling actuators, such as the actuators 38, 39, which will be described in what follows. The reference number 32 designates a further processor designed to carry out functions of controlling a local radio network of the WLAN type, designated as a whole by 320, to which one or more sensors 41, . . . , 4k, . . . , 4n are connected, each of which carries, associated to it, a respective communication interface 410, . . . , 4k0, . . . , 4n0, for example of the type currently referred to as Wireless Peripheral Unit (WPU).

The number n of the sensors in question (consisting, for example, of sensors of pedal speed, pedal cadence, and pedal effort, user heart rate, etc.), as well as the number of the corresponding interfaces, may be any whatsoever.

One of the most interesting characteristics of the solution according to the invention is, in fact, precisely that of offering a very high degree of elasticity in the choice of the number and/or characteristics of the sensors associated to the system 1.

The block 30 is preferably configured in such a way as to be able to receive also the signals coming from other sensors or transducers, such as a transducer 36 which detects the position of the crankwheels fixed to the crankset, or a sensor 37 consisting of a transducer that is able to detect the movement of the cycle chain.

Also as regards these sensors/transducers—designed to be connected to the block 30 by means of respective physical lines, designated by 360 and 370—see what has already been said previously regarding the various sensors comprised in the WLAN network 320.

The control processor 31 interacts—according to modalities that are basically dual with respect to the ones seen previously in relation to the various sensors 41, . . . , 4k, . . . , 4n and 36, 37—also with various actuators, such as the actuators designated by 38 and 39. These are, for instance, actuators associated to the front derailleur and to the rear derailleur in order to control the cycle gear-shift function.

As in the case of the sensors 36 and 37, the communication with the actuators 38 and 39 takes place by means of respective physical lines 380, 390. To these lines there may be advantageously associated feedback lines 381, 391, through which, for example, the actuators 38 and 39 indicate to the processor 31 their own effective position or state of operation.

It is therefore evident that, as in the case of the sensors connected to the network 320, the number and nature of the sensors 36 and 37, as well as the number and nature of the actuators, such as the actuators 38, 39, may be any whatsoever. Also as regards the modalities of communication, it is possible to envisage the insertion of one or more actuators within the wireless network 320.

FIG. 2 shows the possible location of some of the elements represented previously within the cycle.

As regards the arrangement of the blocks 10 and 20, as well as the control buttons 28 and 29, these have already been described previously.

The block 30 may advantageously be set in a position immediately below the bottle-cage so as to locate it in a position that is generically central with respect to the various sensors 41, 42, 43, etc., served by the network 320. In this connection, it will be appreciated that, purely by way of example, there are represented in FIG. 2 three of these sensors located one on the front fork (sensor 41), one in the vicinity of the crankset (sensor 42) and one in an approximately median position along one of the rear forks of the cycle (sensor 43). With reference to the sensor 44, here identified, purely by way of example, as a heart-rate sensor, the possibility is pointed out, for the network 320, of communicating also with sensors that are not necessarily located on the cycle.

The sensor 36 is evidently located in a position corresponding to the crankset, preferably in a position corresponding to the bottom bracket, whilst the sensor 37 is illustrated as being located in a position corresponding to the rear derailleur, so that it will be able to detect movement of the chain. The actuator 38 is here represented in the form of an actuator controlling gear shift.

The reference numbers 50, 50A, 50B are intended to exemplify the presence, on the cycle, of power-supply sources, such as batteries, with the possible arrangement of generators for recharging the said batteries. It should moreover be said that the presence of these generators proves more often than not altogether superfluous, given that the system according to the invention is advantageously suited to being supplied by means of small-sized batteries (for example, watch batteries), having long battery-life times.

It is altogether evident that the representation of FIG. 2 is provided purely by way of example of how some of the elements represented in FIG. 1 may be arranged on the cycle. This representation must not therefore be considered in any way as aimed at illustrating in a complete and/or limiting way such possibilities of location, in particular as regards the possibilities of functional integration for the purpose of enabling an advanced monitoring of the functions of the cycle.

The amount of information linked to achieving the functions described leads to the adoption, for the communication and processing of the data within the system 1, of certain techniques deemed preferential.

Connection between the various modules, and in particular between the blocks 10, 20 and 30, is preferably made according to criteria of bi-directionality, preferably using serial formats. This applies in particular as regards the communication line 12, which connects the blocks 10 and 20, and the communication line 23, which connects the blocks 20 and 30.

The above mode of connection enables transmission of the data in such a way as to reduce as far as possible the number of connections, for example, avoiding a direct connection between the block 10 and the block 30.

The block 10, which is designed to function essentially as a block for managing the system (with functions basically resembling those of a so-called "cycling computer"), is made, as has been said, in such a way as to be preferably removable from the cycle, with the consequent possibility of detection of insertion or removal both by the block 10 itself and by the block 20, with which the block 10 interacts.

In addition, recourse to bi-directional communications, at least for the most important information flows, makes it possible to give clear priority in each flow of information to the information that is deemed of higher importance, moreover guaranteeing the predictability of the communications. Furthermore, the system (and in particular the block 30) is able to monitor properly the state of operation of the power-supply sources, whether these are batteries or generators.

In addition, the system is able to optimize power consumption. This occurs preferably according to the criteria described in detail in two patent applications for industrial inventions, namely Italian Patent Application Nos. TO2000A00296 and TO2000A0292, filed 29 Mar. 2000 and assigned to Campagnolo S.r.l., which are incorporated by reference herein as if fully set forth. In this connection, it will be appreciated that the block 20 is preferably associated to an element (bracket or the like) which enables removable installation of the block 10. This mode of installation facilitates also communication of the block with the push-buttons 28 and 29, implemented preferably via lines that can be incorporated in the handlebars.

The above arrangement also enables the physical connection of the block 20 with the block 30 fixed preferably in a container which is located, as has already been said, underneath the bottle-cage.

Figure 3:
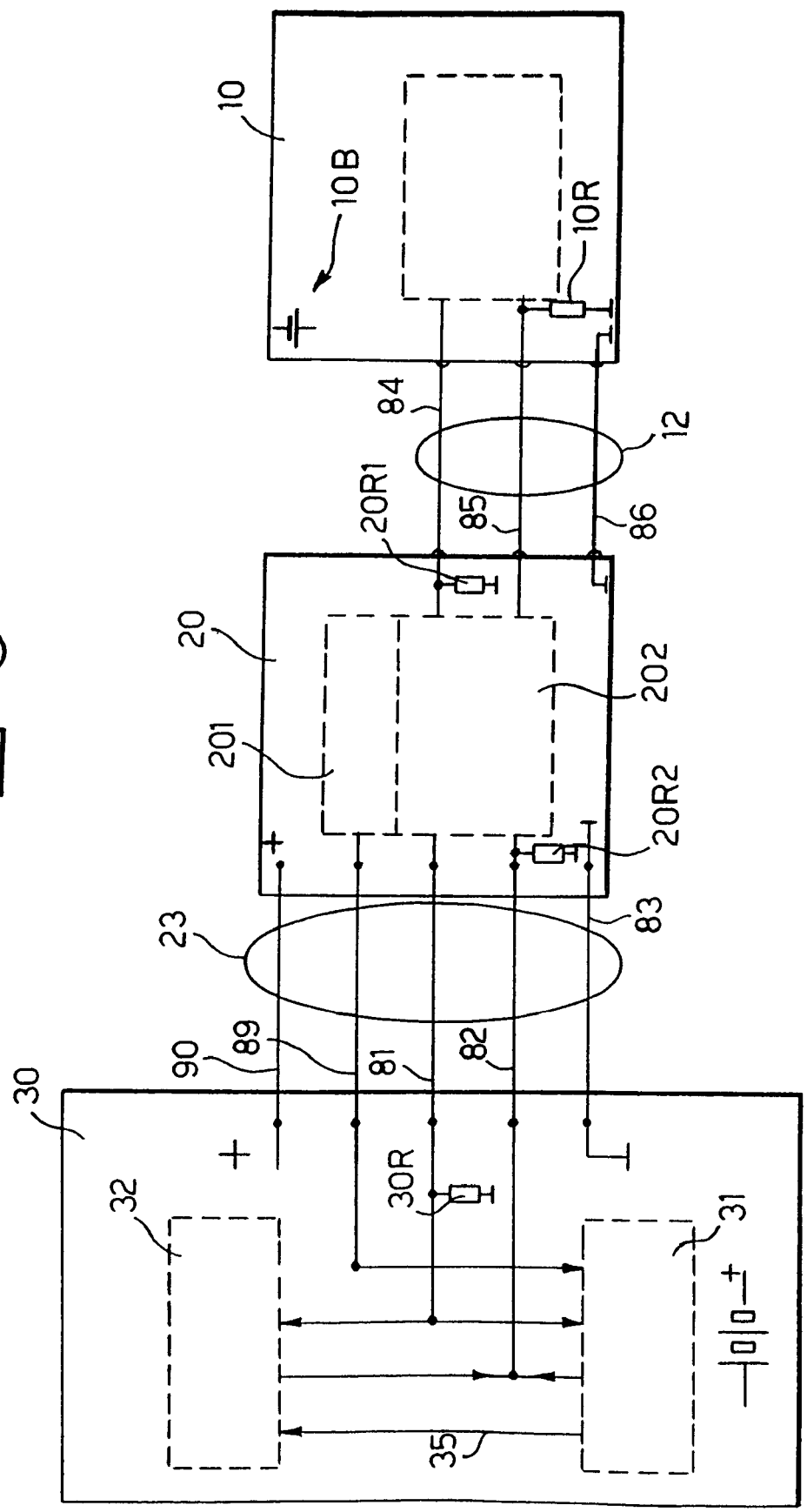
FIG. 3 is a further block diagram illustrating the particularities of some of the elements represented in FIG. 1.

The block diagram of FIG. 3 illustrates, in greater detail, the modalities with which the physical connection between the block 10, the block 20 and the block 30 is preferably made.

As may be seen from the diagram of FIG. 3, the number of connections is preferably limited to the minimum in view of enabling an exchange of information of a bi-directional type, preferably implemented according to an asynchronous-type protocol (and hence one such as not to require a sync or clock signal).

From an examination first of the line 12 which connects the block 10 to the block 20, it may be noted that this line usually comprises, in addition to a ground wire 86, two other wires designated by the reference numbers 84 and 85. The latter two wires or lines are designed to enable, respectively, transmission from the block 10 to the block 20, and transmission from the block 20 to the block 10.

Preferably, the wires 84 and 85 carry, associated to them, on the receiving end of the respective connection, a resistor 10R, 20R1, respectively, set between the wire itself and ground. The aforesaid resistors make it possible to evaluate whether there exists the physical connection between the blocks concerned by evaluating the logic state of the reception signal Rx. If the signal permanently has a logic value "0", this means that nobody is driving the corresponding connection, which represents an indication of absence of connection. In the normal connection condition, the reception signal is kept, at least temporarily, at a high logic level (i.e., at the logic value "1") by the transmission signal Tx.

A substantially similar arrangement is adopted as regards the line 23, which connects the block 20 to the block 30.

In this case, the ground line is designated by the reference number 83, whilst the two wires that enable transmission from the block 20 to the block 30 and from the block 30 to the block 20 are respectively designated by 81 and 82.

Also the latter two wires 81 and 82 carry, associated to them, on the respective receiving ends, resistors 20R2 and 30R, respectively, which are designed to enable evaluation of the existence of physical connection.

The block 20, which basically has the function of a communication unit, is mainly entrusted with the task of:
  verifying that the system 1 is utilizable, in the sense that all the functional blocks 10, 20 and 30 are present and connected together; for example, removal of the block 10, which has the function of a display unit, is detected in the way just described, i.e., as a result of the removal of the resistor 10R, whereby the block 20 intervenes on the system 1 inhibiting complete functionality of the latter, or, at least, as regards the functions linked to the presence of the block 10;
  cyclically polling the control unit 32 of the network 320 to enable updating of the information and transfer thereof (after possible processing) to the block 10;
  processing the requests corresponding to the commands issued, for example via the push-buttons 28, 29 (it will be noted that these push-buttons, which are connected to the block 20, are not reproduced in FIG. 3 to simplify the representation), so as to decide on the transfer of said commands (requests) to the block 10, which functions as a display unit, and/or to the control unit 31 comprised in the block 30.

The activity of the block 20 is governed by the criterion of reducing the times for activation of the resources in order to reduce power consumption.

The information traveling from the block 30 to the block 20 originates from the two functional blocks 31 and 32 already referred to previously.

The block 31 (which is essentially entrusted with the function of interacting with the actuators, such as the actuators 38 and 39) reacts only if its is involved by a request coming from the unit 20; namely, only if there is an actuation command.

In a symmetrical way, the block 32, which is entrusted with management of the network 320, if enabled by a signal sent from the controller 31 on a line 35, cyclically transfers the information coming from the network 320 to the communication unit 20.

Preferably used for this purpose are a protocol and a physical interface which, in addition to using the signals traveling on the lines 81 and 82 for enabling an asynchronous bi-directional communication between the blocks 20 and 30, also use the signal available on a further line 89, which is driven by the processor 201, with the task of arousing the processor 31 configured as a slave. The signal present on the line 35 and generated by the processor 31 has the function of releasing the signal present on the line 82 in order to control the processor 32, which in this case acts as a slave.

Consequently, in normal operating conditions the information originates from the processor 32 and is transferred to the unit 20. If a request needs to be sent from the block 20 to the processor 31, this occurs according to the sequence described below:
  the signal present on the line 89 is activated, the said signal being designed to arouse the processor 31, configured as a slave, and to produce the deactivation level on the line 35 for the processor 32, also configured as a slave;
  after a pre-set period of time, necessary for allowing completion of the possible communication in progress between the processor 32 and the processor 201, the request from the block 201 is made to reach the processor 31 via the signal present on the line 81;

the control of the signal present on the line 82 by the processor 32 is re-enabled via the enabling level of the signal 35 by the processor 31;

once the request has been executed, the processor 31 requests, from the processor 32, control of the signal present on the line 82, via the signal 35, and then, after a pre-set time interval, the reply is sent from the processor 31 to the processor 201; and at the end of transfer of the reply, normal operating conditions are restored, with the line 32 enabled for controlling the signal present on the line 82 via the enabling performed exploiting the line 35.

Again in the context of the communication line 23, the presence of a wire 90 may be noted, which is designed to enable delivery of the supply voltage from the block 30 (connected to which are usually the power-supply sources 50, 50A, 50B) to the block 20. Since the block 10 must be supplied even when it is removed from the system, it has available a power-supply source 10B to its own.

Communication between the block 30 and the block 20 preferably takes place at a pre-defined baud-rate and according to byte frames. A type of frame is generated by the processor 32 to the processor 201; another type of frame involves the processor 31 and the processor 201.

Since the communication is bi-directional, for each one of the two main types of frame there exist specific sub-types for different situations.

Usually the structure of the frames concerned comprises a header byte, which makes it possible to identify the source (processor 31, processor 32, processor 201, etc.) that is transmitting the information and the specific format of the frame:

data block sent by the processor 32 to the processor 201;
state of the block 30 and information on actuators sent by the processor 31 to the processor 201;
requests sent by the processor 201 to the processor 31; and/or
requests sent by the processor 201 to the processor 32.

There then follow specific data fields for each of the types of frame involved in the transmission. A final control byte is then provided for verification of the successful outcome of the communication.

A few examples of communication frames are represented in FIGS. 4 to 7.

In all the above figures, the reference H designates the header byte, whilst the reference CK designates the final control byte.

In a specific way, FIG. 4, which is divided into three parts designated by a), b), and c), represents a few examples of frames usable for transfer of information from the processor 32 to the unit 20.

For example, FIG. 4a) represents a frame that may be used for transferring, to the block 20, information regarding the data gathered by a speed sensor, such as the sensor 41 inserted in the network 320.

In the aforesaid frame, a first field C1 can be used for indicating the number of pulses generated by the speed sensor and/or the value of the mean period of these pulses on a pre-defined time base. A second field C2 can be used for transmitting the number of pulses generated by a sensor, such as the pedal-cadence sensor, and/or the value of the mean period on a definite time base.

FIG. 4b) shows the possible structure of a very simple frame, comprising in addition to the header H and the control byte CK, a single field C3 which may be used for transferring the information regarding the reading made by the heart-rate sensor 44 represented in FIG. 2.

A substantially similar structure is represented in FIG. 4c) with reference to a frame usable, for example, for transmission coming from a pedaling-force sensor. Also in this case, besides the header H and the control byte CK, the frame comprises a single field C4 which may be used for transmitting, for instance, a certain number of values (e.g., sixteen force value) recorded during a rotation of the crankset.

FIG. 5 refers to a more complex frame structure, in which, again in addition to the header H and the control byte CK, there is present a plurality of fields C5 to C8 usable for transmitting, from the processor 31 to the block 20, information regarding the operating conditions of one of the actuators 38, 39 associated to the transmission of the cycle.

In this case, the field C5 is designed to transmit state information, whilst the field C6 conveys the information regarding the position of the rear derailleur and/or the position of the front derailleur. The fields C7 and C8 can be used for providing indications on the height of the position of the rear derailleur and height of the position of the front derailleur.

FIG. 6 shows, instead, a possible frame structure that may be used for transferring information from the processor 201 to the processor 31. Also in this case, in addition to the header H and the control byte CK, a number of fields are present, designated by the references from C9 to C11, which are respectively designed to carry a request byte (depending upon the bit position), a given address to be read/modified, and a given value to be read/modified.

Finally, FIG. 7 illustrates an example of frame structure that may be used for transfer of information from the processor 201 to the control processor 32. In this case, the header H is followed by fields C12 to C14 which are respectively designed to carry a request code, a corresponding address within the network 320, and the configuration parameters of the elements forming part of the network 320. There follows, as usual, the control byte CK.

Preferably, each of the bytes included in the frames represented in FIGS. 4 to 7 is characterized by a trailing edge for the start bit and by two stop bits.

Of course, without prejudice to the principle of the invention, the details of construction and the embodiments may vary widely with respect to what is described and illustrated herein, without thereby departing from the scope of the present invention.

What is claimed is:

1. A system for controlling and managing operations of a mobile bicycle, the system comprising:
   a first interface that displays and manages data;
   a second interface that manages requests from a user; and
   a controller in communication with at least one actuator that controls a gear shifting function of the cycle, wherein the first and second interfaces and the controller are in asynchronous bi-directional communication.

2. The system of claim 1, wherein the first interface is removably mounted to a cycle.

3. The system of claim 1, wherein the second interface activates operation modes of the system.

4. The system of claim 1, wherein the second interface sorts communication to and from the first interface and the controller.

5. The system of claim 1, wherein the controller controls more than one actuator.

6. The system of claim 5, wherein the more than one actuator is activated in response to a request by a user.

7. The system of claim 5, wherein the more than one actuator is activated in response to a signal generated by the controller.

8. The system of claim 1, wherein the controller exchanges information via a wireless local area network (WLAN).

9. The system of claim 1, further comprising at least one sensor for obtaining data regarding conditions of use.

10. The system of claim 9, wherein the at least one sensor senses pedal cadence.

11. The system of claim 9, wherein the at least one sensor senses chain movement.

12. The system of claim 9, wherein the at least one sensor senses pedal effort.

13. A mobile bicycle control system comprising:
   a first processor having an interface that displays and manages data;
   a second processor having an interface that manages requests from a user; and
   a controller in communication with at least one servo member that controls gear shifting functions, wherein the first and second processors and the controller are in asynchronous bi-directional communication.

14. The system of claim 13, wherein the controller exchanges information via a wireless local area network (WLAN).

15. The system of claim 13, wherein the first processor interface is removably mounted to a cycle.

16. The system of claim 13, wherein the second processor interface activates operation modes of the system.

17. The system of claim 13, wherein the second processor interface sorts communication to and from the first interface and the controller.

18. The system of claim 13, further comprising at least one sensor for obtaining data regarding conditions of use.

19. A mobile bicycle gear shift control system comprising:
   a first processor that displays and manages a bicycle's operational data;
   a second processor that receives and manages user requests; at least one controller associated with performing gear shifting functions; and
   an asynchronous communication connection between and among the first and second processors and the controller that selectively activated transmits a communication.

20. The system of claim 19, wherein the controller exchanges information via a wireless local area network (WLAN).

21. The system of claim 19, wherein the first processor interface is removably mounted to a cycle.

22. The system of claim 19, wherein the second processor interface activates operation modes of the system.

23. The system of claim 19, wherein the second processor interface sorts communication to and from the first interface and the controller.

24. The system of claim 19, further comprising at least one sensor for obtaining data regarding conditions of use.

* * * * *